United States Patent [19]

Anderson

[11] Patent Number: 4,913,927
[45] Date of Patent: Apr. 3, 1990

[54] LUBRICATED ALUMINUM WELD WIRE AND PROCESS FOR SPOOLING IT

[75] Inventor: Bruce E. Anderson, Traverse City, Mich.

[73] Assignee: Alcotec Wire Co., Traverse City, Mich.

[21] Appl. No.: 221,892

[22] Filed: Jul. 20, 1988

Related U.S. Application Data

[63] Continuation-in-part of Ser. No. 826,759, Feb. 6, 1986, abandoned.

[51] Int. Cl.$^4$ .................. C05B 11/16; B65B 33/00; B23K 9/28; B23K 35/34
[52] U.S. Cl. ......................................... 427/37; 427/59; 427/156; 72/41; 72/42; 219/137.2; 219/146.22; 428/375; 428/377; 428/380; 242/78
[58] Field of Search .................. 427/154, 156, 37, 59; 72/41, 42, 39, 40; 219/137.2, 146.22; 228/214, 263.17; 242/78; 428/375, 377, 380, 385

[56] References Cited

U.S. PATENT DOCUMENTS

| | | | |
|---|---|---|---|
| 2,157,155 | 5/1939 | Work et al. | 91/68 |
| 2,500,380 | 3/1950 | Rochat | 219/145.22 |
| 3,348,979 | 10/1967 | Murphy et al. | 148/6.2 |
| 3,391,033 | 7/1968 | Chevigny et al. | 148/6.27 |
| 3,676,309 | 7/1972 | Dolomont | 204/27 |
| 3,791,860 | 2/1974 | Zelley et al. | 427/59 |
| 3,895,971 | 7/1975 | Bushey et al. | 148/6.27 |
| 4,233,349 | 11/1980 | Niederhauser | 428/92 |
| 4,674,672 | 6/1987 | Anderson | 228/135 |

FOREIGN PATENT DOCUMENTS

| | | | |
|---|---|---|---|
| 53-20261 | 6/1978 | Japan | 72/42 |
| 55-139195 | 10/1980 | Japan . | |
| 58-47511 | 3/1983 | Japan | 72/42 |
| 55135795 | 8/1983 | Japan . | |

*Primary Examiner*—Norman Morgenstern
*Assistant Examiner*—Margaret Bueker
*Attorney, Agent, or Firm*—Glenn E. Klepac; Alfred D. Lobo

[57] ABSTRACT

Aluminum weld wire having a nascent aluminum surface, (the weld wire is also useful for vacuum and arc metallizing), is lubricated with a dual coating of an essentially anhydrous lower alkanol and a colloidal solid lubricant each present as a layer so thin that they are essentially invisible to the naked eye. The solid lubricant is oil-free colloidal graphite which may be combined with a minor amount of a sulfide of molybdenum. The lubricant particles are deposited from a 1% to 15% by wt dispersion of the particles in the alkanol, in substantially spaced-apart relation, forming a nonuniform, monoparticulate layer on the nascent aluminum surface. The high propensity of the lubricant particles to settle out (they are smaller than 10 microns, and generally smaller than 1 micron in size) from the dispersion, permits formation of the monoparticulate layer. The alkanol layer is so thin that only from 100 ppm to 0.1% of alkanol, by weight of the weld wire, is present. Despite such minimal presence of each layer, the lubricity provided by the dual-coated weld wire is sufficient to level-layer spool the wire mechanically, substantially without human intervention. Because of such minimal presence, neither lubricant layer interferes with the welding process. When the dual-coated weld wire is spooled and sealed in a confined atmosphere provided by a hermetically sealed spool, the alkanol provides protection against oxidation of the nascent aluminum surface; and, despite being a hydrogen-containing material, the alkanol does not interfere with the high quality of the weld produced with the weld wire. Processes for using the weld wire are also disclosed.

28 Claims, 5 Drawing Sheets

LUBRICATED ALUMINUM WELD WIRE AND PROCESS FOR SPOOLING IT

CROSS-REFERENCE TO RELATED APPLICATION:

This application is a continuation-in-part application of Ser. No. 826,759 filed Feb. 6, 1986.

BACKGROUND OF THE INVENTION

This invention relates to lubricated aluminum weld wire, or metallizing wire, with a nascent aluminum surface, for use in a continuously fed welding machine, or metallizing means, respectively; and, a process for spooling an arbitrary length of such weld wire (so referred to herein irrespective of its use) in level layers on a spool which is hermetically sealed in an atmosphere containing a sufficiently high partial pressure of an essentially anhydrous lower alkanol, high enough to provide protection to the weld wire. This invention also relates to a process for welding with the weld wire to form a weld bead essentially free of pores and occluded hydrogen; and, to a process for metallizing with the weld wire to deposit aluminum vapor essentially free of pores and occluded hydrogen. In each case, the weld wire is typically fed off the spool through guides in the feeding means of the continuous welding or metallizing means, respectively.

By "nascent aluminum" (sometimes referred to as "ultraclean" weld wire, though not all ultraclean weld wire has a nascent aluminum surface) I refer to aluminum alloy which is essentially free of aluminum oxide. Because my weld wire is coated with lubricant, it is not ultraclean; therefore, reference to ultraclean weld wire herein, refers to nascent aluminum weld wire which is essentially free from lubricant or solvent. By "aluminum weld wire" I refer to flux-free solid wire, less than 0.25 inch (about 7 mm) thick, of an aluminum alloy which is predominantly aluminum. Fluxed aluminum welding wire is of no interest in this invention is fluxed weld wire introduces too many impurities. Hereafter, the term "weld wire" (for brevity) refers to "aluminum alloy weld wire" unless indicated otherwise. By "lubricated" I refer to the weld wire which is coated with dual thin layer, the first thin layer consisting of subtantially oil-free solid lubricant adherently deposited on the wire's surface, and the second thin layer consisting essentially of an anhydrous lower primary alkanol (hence, "dual-coated"). The solid lubricant is preferably essentially oil-free colloidal graphite ("ofc-graphite" for brevity), or, a mixture of essentially ofc-graphite and a colloidal sulfide of molybdenum, in which mixture the graphite is present in a major amount by weight.

Dual-coated weld wire is uniquely adapted to be fed, essentially continuously, without galling or binding in the guide means associated with power-feeding means of the welding machine. The dual-coated weld wire I make, is most particularly adapted to be so fed, after it is packaged by being wound in level layers of wire, one layer on top of the other, on a hermetically sealed cylindrical spool or reel to be mounted in an appropriate manner to allow the weld wire to be fed off the spool to the welding machine.

One skilled in the art will appreciate that aluminum alloy weld wire must be essentially free of contaminants which deleteriously affect the quality of the weld produced. Most common among such contaminants are the oxides of aluminum, which if present, produce a low quality, porous weld lacking requisite ductility.

Aluminum oxide contaminants are not present on weld wire which is freshly "shaved" or "stripped" in a shaving die, because the wire is protected with a protective layer of an inert relatively heavy lubricant oil which serves a dual purpose. The first is to lubricate the die while the nascent aluminum surface is exposed, for example, by drawing with a diamond die; and the second, is to protect the exposed nascent aluminum surface from oxidation in the ambient atmosphere.

Conventionally, oxided weld wire about 7 mm thick, is shaved in a flood of heavy mineral oil lubricant, or a water-soluble lubricant, then finished by drawing through a multi-die drawing means to the desired diameter (say, 0.062" or 0.3 mm), leaving a nascent aluminum surface coated with the heavy lubricating oil. This heavy lubricating oil is then washed off in a solvent bath, for example, 1,1,1-trichloroethane, and passed through a cocoon or swab of fiber placed at the outlet, to remove the solvent. The problem is that the swab is soon soaked with the oil, and unless the swab is replaced at frequent intervals, the surface of the weld wire becomes contaminated with the oil.

The benefit of such contamination is that the weld wire provides the lubricity required to "level-layer spool" the wire By "level-layer spooling" I refer to the wire being wound onto the spool in level layers, one on top of the other, each layer extending from one end-flange of the spool to the other. Thus each layer has the thickness approximating that of the diameter of the wire, and each layer lies in a circumferential annular zone having a depth, measured in the radial direction, about equivalent to the diameter of the wire.

The drawback of such contamination with the oil is that the weld produced with the easily spooled weld wire, is unacceptable. Of course, the frequency with which the swab is replaced can be minimized by having a large number of solvent baths in series, so that there is progressively less contamination of oil if each successive bath, the last bath being essentially pure solvent. Obviously, this is a less practical solution than replacing the swab frequently.

When a fresh swab is used, the weld wire is "ultraclean" and produces a high quality weld. The problem is that the weld wire has no lubricity. As a result, it resists being spooled in level layers, typically requiring a spooling guide means, often supplemented by manually, frequently guiding the wire with a stick, as the occasion and visual inspection demands, to level-layer wind the wire onto the spool. Overcoming the problem of spooling the ultraclean wire, in turn, begets the complementary problem of having the wire gall and bind in the feeding means to the welding gun, not too surprisingly, since the wire has no lubricity. It is well known that bare aluminum surfaces are not well adapted for use with other metal surfaces because of the inherent softness of the metal and its tendency to bind or adhere, especially when in contact with other bare aluminum surfaces. When the wire stops feeding, the welding stops until the feed is reinstated.

With respect to the problem of level-layer spooling, lubricating an aluminum surf-ace to be in contact with another metal or aluminum surface, was suggested by Work et al who used finely divided graphite secured to the bare aluminum base with an artifically produced aluminum oxide coating formed by aluminum and an alkali metal silicate, as more fully described in U.S. Pat.

No. 2,157,155 (Cl. 91/subcl. 68). Clearly, they were aware of the difficulty of coating a bare aluminum surface with finely divided graphite without a binder. The problem was ameliorated when "colloidal-graphited water", a dispersion of colloidal graphite in water, was used, rather than in a non-aqueous and relatively non-volatile vehicle such as soils, greases and glycerin (see pg 2, col 1, lines 32–41).

Recognizing the desirability of having only graphite as the lubricant, and the attendant difficulty of adhering the graphite to any welding wire surface (since no particular metal is specified, presumably including aluminum, magnesium, tantalum, titanium, etc.) Kobayashi describes (in Japanese Patent No. 55-139,195 assigned to Matsuhita Electric Industries) a welding wire surface coated with an anti-corrosion substance, lubricant, etc., by rubbing the wire on the solid substance at an appropriate speed at either a perpendicular or inclined angle, the thrust of the invention being to control the amount of graphite adhering to the wire by varying the force with which the solid is pressed against the wire, and by changing the orientation of the solid so that it is worn more or less evenly, rather in a local 'wear-spot'. Further recognizing that in many instances the presence of water may be detrimental to the quality of the weld produced with moisture contaminated wire, Kobayashi teaches heating the surface of the wire to a temperature in the range from above 100° C. but below 250° C. When welding wire is rubbed across a graphite block with sufficient force, such heating serves a two-fold purpose: it gets rid of moisture, and, it helps strip particles of graphite from the block. His invention teaches the criticality of not pressing the solid lubricant into the wire at a fixed position.

It is obvious in light of the all-encompassing scope of the disclosure, that if the anti-corrosion substance is lard, such rubbing against a lard block is unlikely to damage even magnesium wire, but that if the block is graphite, one would be forcefully ill-advised to rub the magnesium wire against the graphite block with susubstantial force and speed without expecting to damage the surface of the wire, or worse, cause a conflagration, especially if the magnesium wire was preheated. Knowing that Kobayashi's general disclosure is not applicable to all metal wire, one can only guess at what the effect of rubbing aluminum weld wire might be, particularly since one skilled in the art, by trial and error, would have to determine the force necessary, and the speed at which the wire is to be drawn across the block.

The necessary trial and error determination was made with aluminum weld wire having a nascent aluminum surface, and it was found that the surface of the weld wire is scored so severely as to interfere with mechanically feeding the wire to a continuous welding machine through guides in the feeding means Further, the graphite-coated wire so produced is of no interest for my intended purpose since it results in a wire coated with only graphite, and not a dual-coating. The demonstrative evidence provided by the appended photomicrographs provides a visual distinction between the 'spotted-graphite (so termed because of the separation of particles which provides a substantially monoparticulate thin layer) nascent aluminum surface of my dual-coated weld wire, and any prior art weld wire, particularly those produced by the techniques disclosed in Kobayashi.

To emphasize the criticality of the method of coating a wire with the expectation of obtaining a specifically characterized coating on it, Kobayashi deliberately recites what superficially appear to be comparably effective conventional techniques for coating welding wire, but are not equally effective. Such techniques are: (1) a final rolling using a liquid lubricant into which an appropriate amount of powdered graphite has been mixed, thus adhering the graphite to the wire surface; (2) passing the welding wire through a vessel containing powdered graphite, such that the graphite adheres to the wire surface; and, (3) coating the graphite by pressing it into wire at a fixed position. He specifically points out the deficiencies of techniques (1) and (2) namely, that the strength and adhesion of the graphite to the wire is low, and it is easy for the graphite to come off the wire surface during winding or other subsequent stages, and, it is difficult to control the amount of graphite which adheres to the wire.

In what appears to be an implicit reference to aluminum weld wire, he states, "In particular, technique (1), because it normally uses fats and oils such as paraffins, fatty acid esters, or mineral oils as lubricants, either singly or in combinations, is unusable for composite wire into which these fats and oils can easily penetrate, since the hydrogen emitted by these fats and oils will cause welding cracks and porosity in the weld." I nevertheless chose a hydrogen-containing dispersing medium, namely a lower alkanol having from 2 to 4 carbon atoms, as the continuous phase in my solid lubricant dispersion (in which the solid is the dispersed phase), but require that the alkanol be free from water in an amount sufficient to adversely affect the physical qualities of the weld made with the weld wire.

With particular respect to technique (2) Kobayashi states that "the graphite can build up in large quantities in some spots, so that this graphite piles up as it is scraped off the surface of the wire inside the wire feed path during welding; smooth welding is thus frequently interrupted; and, because powdered graphite is used as is, ease of handling is extremely poor."

Thus, the art recognizes that the method of coating welding wire generally, the particular lubricant used, and the specific form in which the lubricant is used, each produce a different coating on the wire. Moreover, it is obvious that adequately lubricated weld wire will level-layer spool. With specific respect to weld wire (with a nascent aluminum surface) it is also obvious that if the lubricant is thoroughly removed, it will produce a low porosity, high-quality weld of requisite ductility, inter alia. Since shaving the weld wire without a lubricant was not practical, the emphasis turned to feeding a lubricant-free weld wire to the welding gun with a simplified feeding means which would not bind the weld wire.

Though the ultimate problem to be solved was to produce high quality welds with continuously fed weld wire having a nascent aluminum surface, the immediate problem was to level-layer spool the wire so that it could be fed smoothly through the feeding means of a welding machine. For obvious reasons, the problem could not have arisen prior to the advent of 'continuous-feed' welding machines for aluminum weld wire. Also for obvious reasons, the creation of a lubricated aluminum weld wire with known lubricants, for the sole purpose of lubricating it, is well within the skill of the art of lubricating wire for wire-feeding machines.

Thus, despite knowing that a lubricated weld wire was unsuitable for the intended purpose, I nevertheless chose to focus my efforts towards using a lubricated weld wire to produce a high quality weld. I therefore needed to direct my efforts to each step of producing a lubricated nascent weld wire in level-layers on a spool, then finding a lubricant, whether the safe or another, which did not interfere with producing the desired high quality weld. In addition, the surface of the weld wire had to be essentially free of hydrogen-containing contaminants, particularly moisture, or the quality of the weld is unacceptable. Solutions to the problem of providing aluminum weld wire free of deleterious contaminants are more fully described, for very different approaches to the problem, in U.S. Pat. Nos. 3,348,979 to Murphy et al (Cl. 148/subcl. 6.2) and 3,676,309 to Dolomont (Cl. 207/subcl. 27). By "essentially free of "moisture" I refer to the presence of less than 1000 ppm of water in the lubricant-coating, which in my invention, is the dual-layer coating.

I chose to retain the heavy mineral oil for the shaving dies, then aggressively clean off the weld wire coated with the mineral oil (referred to herein as the first lubricant) with a series of solvent rinses so that the weld wire is ultraclean (that is, having a nascent aluminum surface uncontaminated be any material), then replacing the first lubricant with a second, solid lubricant which would not interfere with the quality of the weld. In addition, the lubricated wire would need to be protected against oxidation after it was spooled, during the period it was shipped, stored and eventually used in a continuous welding machine.

Numerous references disclose lubricant compositions for aluminum, among these being U.S. Pat. Nos. 3,391,033 to Chevigny et al (Cl. 148/subcl. 6.27); and 3,895,971 to Bushey et al ,.Cl. 148/subcl. 6.27), inter alia. None suggests the combination of an anhydrous lower alkanol in combination with colloidal graphite, which is the subject matter of my U S. Pat. No. 4,674,672 (Cl. 228/subcl. 135), or, a major amount by weight of colloidal graphite and a minor amount of a molybdenum sulfide.

SUMMARY OF THE INVENTION

It has been discovered that aluminum, or a predominantly aluminum alloy, such as an aluminum wrought alloy, or aluminum cast alloy weld wire, having a nascent aluminum surface, which wire is used for welding and metallizing ("weld wire" for brevity), may be lubricated with a dual coating consisting of an essentially anhydrous lower alkanol and a solid lubricant, each present as thin layers.

It is therefore a general object of this invention to provide an arbitrary length of weld wire having a substantially monoparticulate thin layer of essentially oil-free colloidal graphite ("ofc-graphite") particles on the surface ("spotted graphite" surface) of the weld wire which is wetted with the lower alkanol ("alkanol-wetted surface").

It is a specific object of this invention to provide a lubricated predominantly aluminum wire selected from the group consisting of a wrought alloy of the 1000, 2000, 4000 and 5000 series, and a cast alloy of the 100, 200 and 300 series, having a nascent aluminum outer surface simultaneously dual-coated with a substantially monoparticulate layer of colloidal particles of solid lubricant, and, with a second layer of from about 100 ppm to about 0.1%, preferably from 0.01% to about 0 1% by weight of the weld wire, of an essentially anhydrous lower primary alkanol having a boiling point below 100° C. and a viscosity lower than about 5 cp, preferably less than 3 cp at 15° C., the solid lubricant being deposited on the surface from a dispersion of the colloidal solid lubricant particles in the alkanol, the solid lubricant being present in the dispersion in an amount in the range from about 1% to about 15% by weight based on the weight of the dispersion, whereby the solid lubricant particles are deposited in spaced-apart relationship over the nascent aluminum surface.

It is also a general object of this invention to provide a process for lubricating aluminum weld wire, comprising, drawing oxided wire through multiple drawing dies to shave the wire and expose a nascent aluminum surface while flooded with a conventional drawing lubricant ("first lubricant", or "lubricant oil"); removing the lubricant oil with a solvent therefor, which solvent, in turn, is removed to provide an ultraclean nascent aluminum surface; bathing the ultraclean surface with a dispersion of a colloidal solid lubricant in an essentially anhydrous hydrogen-containing lower alkanol; wiping off, or otherwise removing enough of the dipsersion from the bathed surface to deposit a thin discontinuous layer of colloidal graphite particles over the alkanol-wetted nascent aluminum surface.

It is therefore also a specific object of this invention to provide a process for lubricating aluminum weld wire, comprising, (a) exposing nascent aluminum on essentially the entire outer surface of the weld wire while the wire is lubricated with a lubricant oil, typically a mineral or vegetable oil, (b) removing the lubricant oil with a solvent for it, typically a halogenated hydrocarbon such as a chlorohydrocarbon, to produce an ultraclean nascent aluminum surface, (c) soon thereafter contacting the ultraclean surface with a dispersion of a colloidal solid lubricant consisting predominantly of substantially colloidal graphite optionally in combination with a colloidal sulfide of molybdenum, in essentially anhydrous ethanol, n-propanol, iso-propanol, n-butanol, 2butanol, or isobutanol, the solid lubricant being present in an amount in the range from about 1% to about 15% by weight based on the weight of the dispersion, and, (d) removing a sufficient amount of the alkanol to deposit a substantially monoparticulate layer of said colloidal graphite over the alkanol-wetted nascent aluminum surface.

It is another specific object of this invention to provide a process for producing level-layer spooled lubricated aluminum weld wire which comprises, (a) drawing ("shaving") a predominantly aluminum, flux-free, weld wire lubricated with a lubricant oil, to produce an oil-coated weld wire having a nascent aluminum surface coated with the lubricant oil;

(b) contacting the oil-coated weld wire with sufficient solvent for the oil to remove it from the surface and produce ultraclean weld wire having a nascent aluminum surface essentially free of the lubricant oil;

(c) passing the ultraclean weld wire through a dispersion of a colloidal solid lubricant (present as the dispersed phase in the dispersion), in a liquid, hydrogen-containing continuous phase, namely an essentially anhydrous lower alkanol having from 2 to 4 carbon atoms, said solid lubricant consisting essentially of a major amount, preferably from about 60% to about 90% by weight of essentially oil-free colloidal graphite, in combination with a minor amount by weight, preferably from 10% to about 40% by weight, of a colloidal sulfide of molybdenum;

(d) removing sufficient excess dispersion so as to leave an alkanol-wetted weld wire with a spotted-graphite surface; and, (e) level-layer spooling the alkanol-wetted weld wire onto a spool.

It is another general object to provide a process for level-layer spooling lubricated weld wire; and, to provide a spool of lubricated weld wire hermetically sealed in an atmosphere containing a sufficiently high partial pressure of an essentially anhydrous lower alkanol, high enough to provide protection to the weld wire.

It is also a general object to provide processes for vacuum metallizing or arc metallizing with the lubricated predominantly aluminum weld wire of this invention.

It is therefore yet another specific object of this invention to provide a process for metallizing with lubricated predominantly aluminum weld wire which comprises, (a) feeding the weld wire which typically is an aluminum wrought alloy of the 1000, 2000, 4000 and 5000 series, or an aluminum cast alloy of the 100, 200 and 300 series, having a nascent aluminum outer surface coated with a non-uniform substantially monoparticulate thin layer of solid lubricant contaminated with from about 100 ppm to about 0.1% by weight of the lubricated weld wire, of an essentially anhydrous hydrogen-containing liquid which, because it is present in combination with the solid lubricant, provides sufficient lubricity to the weld wire to allow it to be level-layer spooled, and thereafter, (b) vaporizing the lubricated wire in vapor-depositing proximity with a deposit-receptive surface, and, (c) depositing aluminum vapor essentially free of pores without occluding hydrogen.

It is still another general object of this invention to provide a lubricant composition to lubricate frictionally abutting aluminum surfaces, the lubricant composition consisting of a dispersion of essentially ofc-graphite in essentially anhydrous ethanol, n-propanol, isopropanol, n-butanol, 2-butanol, or isobutanol, the essentially ofc-graphite being present in an amount in the range from about 1% to about 15% by weight based on the weight of the dispersion.

It is therefore yet another specific object of this invention to provide a process for welding aluminum and aluminum alloy surfaces, using a lubricant composition to lubricate frictionally abutting aluminum and/or aluminum alloy surfaces forming a joint to be welded, comprising lubricating a portion of at least one of the surfaces with the above-identified dispersion of ofc-graphite in a lower alkanol, removing the lower alkanol, and welding the surfaces together with the lubricated weld wire.

BRIEF DESCRIPTION OF THE DRAWINGS

The foregoing and other objects and advantages of my invention will appear more fully from the following description, made in connection with the accompanying SEM (scanning electron microscope) photomicrographs presented as the following figures, or a preferred embodiment of the invention, and relevant prior art, wherein like reference characters refer to the same or similar material, or zone of material, throughout the views and in which.

DETAILED DESCRIPTION OF PREFERRED EMBODIMENTS

In the best mode, the lubricated weld wire I produce is an aluminum wrought alloy or aluminum cast alloy having a diameter in the range from about 0.8 mm (0.03 in) to about 3.2 mm (0.125 in). The aluminum wrought alloy is an alloy selected from the group consisting of alloys of the 1000, 2000, 4000 and 5000 series, and the aluminum cast alloy is an alloy selected from the group consisting of alloys of the 100, 200 and 300 series. The weld wire is typically made from 1100, 2319, 4043, 4047, 4145, 4643, 5154, 5183, 5356, 5554, 5556 and 5654 wrought alloys; and, R-206.0, R-A 356.0, R-A 357 0, and R-A 357.2 cast alloys.

The foregoing wire is conventionally derived by drawing oxided wire through multiple drawing and shaving dies to remove the oxide from the surface and produce a nascent aluminum surface which is critical to the acceptable performance of the weld wire for the purposes, namely welding, metallizing and the like, for which it is used. In this conventional process, the wire is lubricated with a variety of lubricants, both mineral base and vegetable base, referred to herein as a "lubricant oil" to identify it differently from the solid lubricant I use. The mineral base lubricants are petroleum products such as heavy mineral oil. The vegetable base lubricants include vegetable oils and metal soaps such as zinc, lead, magnesium and tin soaps. Such lubricant oils may in addition, contain solid lubricants such as colloidal graphite.

Solid colloidal graphite particles are commercially prepared, typically, by milling in a mineral oil which is then removed. But the resulting colloidal graphite is not substantially oil-free because of the medium in which the graphite is micronized. Such oil-contaminated colloidal graphite, though usable to provide the weld wire of my invention, produces welds which may be acceptable for low-quality welds but are unacceptable as high-quality welds generally demanded for wheels, other load-bearing aluminum members, aircraft components and the like. Such high quality welds are characterized by a freedom from pores and micropores which adversely affect the ductility, strength and other mechanical characteristics which uniquely identify a high-quality weld. Therefore the colloidal graphite I prefer is a substantially oil-free colloidal graphite (hereafter "ofc-graphite" for brevity) produced without using oil so as to have a minimum 99.8% carbon (determined by loss on ignition), about 0.1% ash, less than about 0.01% moisture, and less than 0.01% volatiles, with a maximum average particle size less than 5 microns, and preferably less than 1 micron.

The amount of ofc-graphite is in the range from about 1% to about 15% by weight of the dispersion, preferably from about 2% to 8%.

In addition to the ofc-graphite, a minor amount of at least one solid, very finely divided sulfide of molybdenum, typically having a primary particle size less than 1 micron, for example in the range from about 0.05 to about 0.5 micron, may optionally be combined with the ofc-graphite, mainly to provide desirable electrical properties to the mixture of solid lubricants. When used, such minor amount may range from about 1% to about 49% by weight of the solid lubricant in the dispersion. Such sulfides of molybdenum include molybdenum disulfide ($MoS_2$), molybdenum trisulfide ($MoS_3$), molybdenum pentasulfide ($MoS_5$), and molybdenum sesquisulfide ($Mo_2S_3$), the first named being most preferred. Though as much as 49% by weight of molybdenum sulfide, relative to the combined weight of ofc-graphite and sulfide of molybdenum, may be used, it is preferred to use less than about 40%.

The amount of solid lubricant deposited on the weld wire is preferably so little that, by itself, the monoparticulate thin layer is insufficient to provide adequate level-layer spooling lubricity. By adequate level-layer spooling lubricity I refer to sufficient lubricity to level-layer spool the wire without undue human attention. Adequate level-layer spooling lubricity is provided by the combination of solid lubricant and lower alkanol. Though a larger amount of solid lubricant may be used, it is unnecessary for the purpose to which the weld wire is to be put. Though graphite is essentially insoluble in a molten aluminum weld bead under the conditions of welding, and is therefore rejected, the less graphite present, the better.

The amount of solid lubricant deposited is so small that it is visually difficult to detect with the naked eye, the appearance of the lubricated weld wire being essentially the same as that of ultraclean nascent aluminum wire. The reason for such visual similarity is that the solid lubricant is deposited on the nascent surface in such a small amount that it forms a substantially monoparticulate layer, also referred to as a "first thin layer" because it coexists with a thin layer of anhydrous lower alkanol, referred to as the "second thin layer", concurrently deposited on the wetted, lubricated weld wire before it is spooled.

Typically, the weld wire is drawn to size with a drawing lubricant oil which is washed off in a light mineral oil bath and spooled on a large processing or transport spool (about 200 lb). The wire is thus protected before it is unwound to be thoroughly cleaned by multiple sequential washes of progressively cleaner chlorocarbon solvent. The chlorocarbon-wetted surface, free of oil is then dried to remove the chlorocarbon and provide an ultraclean nascent aluminum surface. The ultraclean wire is thereafter coated before it has time to be unacceptably oxidized, with the dual-coating by passing it through the bath, and wiping off the excess. The lubricated dual-coated wire is then wound, a second time on smaller shipping spools carrying 15.8 lb or 1 lb of weld wire.

Despite its presence in an amount less than 0.1% by weight of the weld wire, the alkanol chosen is uniquely able to provide, but only in combination with the solid lubricant, the level of lubricity required for level-layer spooling. This requisite level of lubricity is not provided by either the solid lubricant, or the alkanol, when either is used alone. Moreover, because the alkanol is present in so small an amount, it is the only hydrogen-containing substance I know which serves as a vehicle to deposit the solid lubricant under convenient processing conditions, yet will not vitiate the quality of the weld under the conditions of its use. And, because it is present in so small an amount, the alkanol is evaporated by frictional contact with the guide means of power-feeding means associated with the continuous welding machines, under the conditions in which the weld wire is fed from a spool mounted to dispense the wire.

Under conditions where time and heating are sufficient to evaporate a $C_4$ alcohol, n-butyl alcohol, sec-butyl alcohol, and isobutyl alcohol may be used. Such conditions may prevail when my lubricant composition is used in a process for welding aluminum and/or aluminum alloy articles together, as disclosed in my aforesaid '672 patent, the disclosure of which is incorporated by reference thereto as if fully set forth herein. However, the conditions of use of the weld wire dictate that the alkanol preferably be evaporated at a temperature below 100° C., and I found that to provide the desired spaced apart particle-to-particle relationship, the alkanol preferably has a viscosity in the range from about 2 cp to 3 cp at 15° C. Between n-propanol and isopropanol which are primary alcohols having the requisite viscosity, isopropanol is most preferred.

Still further, my lubricant composition has the unique ability to provide a protective blanket of alkanol vapor for the weld wire wound on a "hermetically" sealed spool. Though a hermetically sealed spool is desirably so sealed, reality dictates that commercially available synthetic resinous materials used to provide such seals, have a significant water vapor transmission rate ("WVTR"). Even a very low WVTR, over a period of time, will result in leakage of sufficient moisture to denigrate the essentially water-vapor-free atmosphere in which the spool was originally sealed, particularly if the spool is stored under unfavorable storage conditions. A preferred film for sealing a spool is a thick (about 3.5 mil) film of a shrink-wrap polyolefin, for example, a low- to medium-density shrink polyethylene.

To minimize deterioration of the weld wire, the anhydrous alkanol provides a partial pressure of at least 5 mm at room temperature (20° C.). Because the alkanol vapor is heavier than air, it provides a surprisingly high degree of protection against moisture leaking into the hermetically sealed spool. Lower alkanols having partial pressures in the range from about 20 mm to about 60 mm, such as isopropanol and propanol are particularly so suited.

It will now be evident why it is critical that the lower alkanol be essentially anhydrous. Though the alkanol may contain as much as 1000 ppm of water if the weld wire is to be used within a short period after it is dual-coated, it is preferred that the water content of the alkanol be less than 100 ppm, most preferably in the range from about 1 to 90 ppm.

In my process, it is essential that the drawing lubricant oil used to produce the nascent aluminum surface be thoroughly removed. This is preferably done in plural stages, the first of which may include rinsing the drawing lubricant with a lighter oil which is more easily dissolved by a liquid chlorohydrocarbon. Washing with the chlorohydrocarbon, preferably 1,1,1-trichloroethane, is effected in a succession of washing jets. After the final washing, the weld wire now wetted with essentially pure chlorohydrocarbon, is dried with a jet of inert gas, or by passing through a vacuum box, to produce an ultraclean weld wire with a nascent aluminum surface.

The ultraclean weld wire is bathed in a bath of a colloidal dispersion of solid lubricant (rather than a colloidal suspension) because it is a convenient way to deposit the requisite small amount of solid lubricant. The term "dispersion" is used specifically to connote that particles of the solid lubricant, say, ofc-graphite and colloidal molybdenum disulfide in a 70:30 mixture, will settle out if not agitated. The solid lubricant is most preferably present in an amount of about 5% by weight in a dispersion of anhydrous isopropanol which is vigorously, continuously agitated.

The weld wire is wetted by the dispersion as the weld wire is passed through the bath at a predetermined speed so chosen as to deposit the requisite amount of solid lubricant on the weld wire. The wettability of the weld wire by the dispersion, and the speed with which the colloidal particles of the solid lubricant are deposited from the dispersion onto the nascent aluminum surface, are characteristics which are instrumental in producing the lubricated weld wire economically. The wire leaving the bath may be dressed by contact with a dressing means, such as a squeegee or sponge to remove excess dispersion.

The dressed wire, thus simultaneously dual-coated with a first thin layer of solid lubricant and a second thin layer of anhydrous alkanol, is found to spool in level layers with the same facility as weld wire lubricated with lubricant oil. This characteristic of level-layer spooling is of particular interest not only in large processing spools (or transfer spools) but also in small spools, say those made in 15.8 lb and 1 lb weights, which are hermetically sealed in a very low WVTR plastic film in a conventional manner, for storage and shipment.

To weld with the weld wire, the hermetically sealed spool is unsealed, preferably just prior to being used, and operatively mounted to dispense the weld wire to the continuous welding machine. The available end of the weld wire is withdrawn from the spool which is unwound as the wire is fed through an orifice and other guide means associated with the welding machine, until it is positioned adjacent a joint between a pair of aluminum or aluminum alloy surfaces to be welded together. A sufficiently high potential difference is generated between the end of the weld wire and the surfaces to be welded, high enough to produce an electric arc capable of melting the end portion of the weld wire and forming a molten weld bead fused to the surfaces. Upon cooling the weldment so formed is found to be of high quality, free of objectionable micropores and pores, and having excellent ductility and physical strength characteristic of the particular alloy from which the weld wire is produced.

Aluminum or aluminum alloy surfaces to be welded after they are frictionally abutted, one against the other, are first lubricated with a dispersion which consists essentially of ofc-graphite and the anhydrous alkanol, by wiping the dispersion onto at least one of the surfaces which is thus dual-coated with the alkanol and ofc-graphite. The wetted surfaces are then press-fitted into engagement, and positioned relative to each other, where they are to be welded together. The alkanol is then removed by heating or allowing it to evaporate under ambient conditions over a long period of time. After the joint is essentially free of the alkanol, the press-fitted surfaces are welded together with the lubricated weld wire, forming a weld bead above the joint.

The lubricated weld wire is also suitable for use in vacuum metallizing or arc spray metallizing in conventional means for accomplishing the purpose. Aluminum wrought alloys of the 1000 series are preferred, although those of the 4000 series may be used in specialized applications requiring higher strength and lower melting temperatures than the 1000 series.

In vacuum metallizing, spools of metallizing wire and substrates to be metallized are both placed in a vacuum chamber. The wire used is preferably an aluminum wrought 1199, 1188, 1100 or 1350 alloy. The weld wire is fed from a mounted spool into a vaporizing heater. The resulting vapors are electrically charged while the substrate is charged with opposite polarity, so that the vapors are deposited on the substrate in a uniform layer. Such vacuum metallizing produces a metallic aluminum film on both nonmetallic and metallic surfaces. Metallized aluminum products include bottle labels, chewing gum wrappers, metal handles, metal door lock pulls, and the like.

In arc spray metallizing, an end of weld wire from each of two rotatably mounted spools are concurrently fed into a hand-held spray gun. The metallizing wire used is preferably an aluminum wrought 1100, 1350 or 4043 alloy. An arc is struck between the ends of the wires and molten metal is blown from the arc onto a substrate to be metallized. The molten aluminum mechanically adheres to the substrate. Arc metallizing is principally used to produce corrosion-resistant steel structures such as ship hulls, tanks, bridges, oil drilling rigs and furnace linings.

In each of the foregoing processes, particularly those in which a high volume of metal is to be generated from the weld wire fed to the welding gun, particularly for example in arc metallizing processes, the easy, non-binding feeding of the weld wire is of all-important commercial significance. Though each of the foregoing conventional processes have been practiced commercially for some time, they have been carried out with equivocal reliability and produced articles of indifferent quality because there has been a hitherto unfulfiled need for a suitably lubricated weld wire for the purposes stated.

The weld wire of my invention is readily distinguished from prior art weld wire, as evidenced by the appended high magnification photomicrographs taken at about 2000X.

Figure 1:
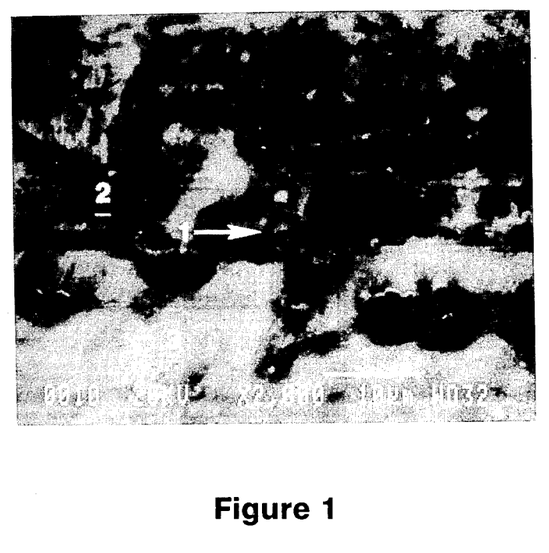
FIG. 1 is a photomicrograph of drawn aluminum 4043 weld wire which is lubricated with a heavy mineral oil to facilitate drawing through multiple drawing (or "shaving") dies, to produce a nascent aluminum surface.

Referring first to FIG. 1, there is shown a SEM (scanning electron microscope) photomicrograh of drawn aluminum 4043 weld wire which must be clened before jt cbnber used for welding. The nascent aluminum surface is covered by smudges, indicated geenrally by reference numeral 2. The smudges are of carbonaceous deposits derived from the heavy mineral oil used to draw the wire. The nascent aluminum surface is seen as relatively bright areas, one of which is indicated by reference numeral 3, written in the figure directly above the "K" of the "20 KV" accelerating voltage used to operate the instrument. The dark spot in the center is a void, indicated by numeral 1. Such voids are typical of drawn aluminum wire, and are initiated over the entire surface during the drawing operation.

Figure 2:
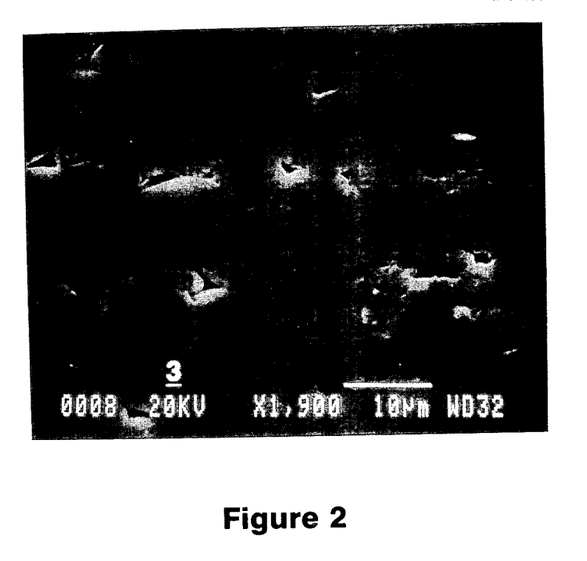
FIG. 2 is a photomicrograph of the drawn aluminum 4043 weld wire shown in FIG. 1, after it is thoroughly cleaned ("ultraclean").

Referring to FIG. 2, there is shown a nascent aluminum surface of the drawn weld wire after it is thoroughly cleaned. Numerous voids are evidence in the overall bright clean nascent aluminum surface 3. But there is no visible carbonaceous deposit, hence "ultra-clean". Note tthe bright surface is seen as being darker than it was in FIG. 1 because the 'brightness adjustment' for each photomicrograph was not the same. It is impractical to adjust all brightnesses to match exactly in all photomicrographs.

Figure 3:
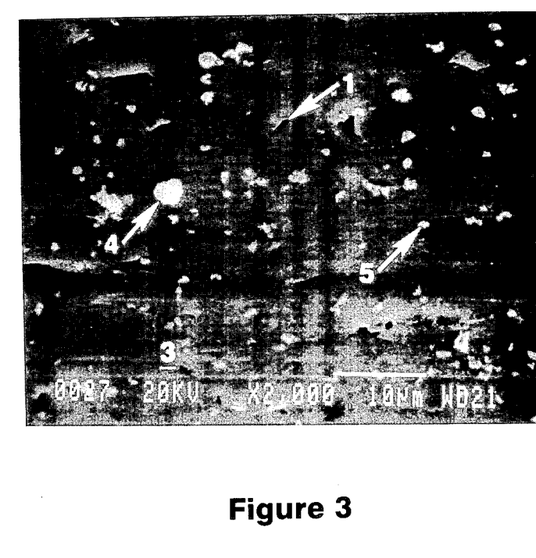
FIG. 3 is a photomicrograph of the drawn aluminum 4043 weld wire after it is lubricated with the lubricant dispersion (5 wt % solids an anhydrous isopropanol) of this invention. The isopropanol evaporated before the photomicrograph was made.

Referring to FIG. 3, there is shown a dual-coated weld wire of my invention, in which the nascent aluminum surface was coated concurrently, with thin layers of both anhydrous isopropanol and colloidal solid lubricant. The coating was provided by passing the ultraclean weld wire through a dispersion of a 70:30 mixture of cof-graphite and $MoS_2$, present as a 5 wt % dispersion. The isopropanol, if present, is not visible, but the solid lubricant is visible as scattered particles of graphite and $MoS_2$. As before, large expanses of relatively clean nascent aluminum surface 3, and voids 1, are clearly visible. The discrete scattered particles are seen in substantially spaced-apart relationship, forming a monoparticulate layer. The particles are randomly distributed. The largest of the particles, identified by numeral 4, is a carbon particle, identified as such by the carbon peak in a X-ray spectrum obtained by energy dispersion of the X-rays. The nascent aluminum surface is characterized by the absence of a significant oxygen peak in the spectrum, indicating the substantial absence of oxygen. Some of the smaller particles, such as one indicated by numeral 5, are $MoS_2$ particles, identified as before, by EDS analysis. It is this monoparticulate distribution of scattered particles smaller than 10 microns, which unexpectedly provides sufficient lubricity for level-layer spooling the lubricated wire, at the same time, prevents an unacceptably high build-up of rejected graphite near the tip of the welding gun. Too high a buildup interferes with the flow of electrical current required to weld with the weld wire.

Though not visible in this high magnification photomicrograph, but seen in lower 125X and 500X magnifications, these particles are distributed in a non-uniform manner over the surface. Evidence of such non-uniformity is presented by large areas such as bands, having substantially far fewer particles distributed therein than those in other areas.

Figure 4:
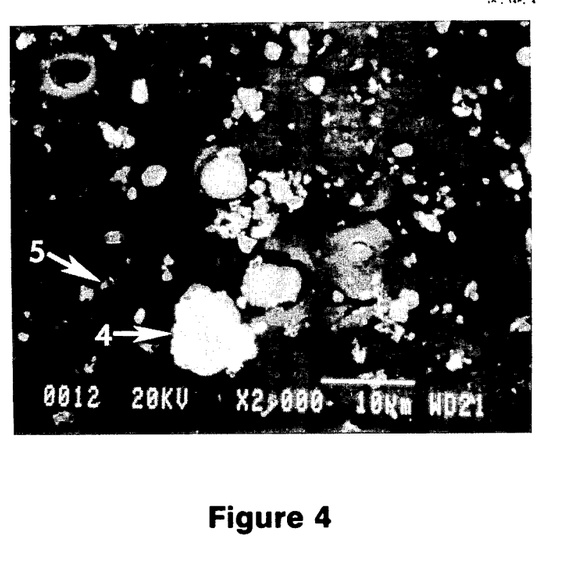
FIG. 4 is a photomicrograph of drawn aluminum 4043 weld wire after its nascent aluminum surface was allowed to be oxidized in a humid air atmosphere, then lubricated with an identical lubricant dispersion (5 wt % solids in anhydrous isopropanol) used for the lubricated wire shown in FIG. 3. As before, the isopropanol evaporated before the photomicrograph was made.

Referring now to FIG. 4, there is shown an aluminum wire having an oxidized surface which is coated under identical conditions, with the same dispersion used to coat the weld wire shown if FIG. 3. As seen, there is a much denser distribution of particles which are more uniformly distributed over the surface. The uniform distribution is more evident if lower magnification photomicrographs. This uniformity is attributable to the oxidized layer of aluminum. The spectrum shows a very large oxygen peak which clearly distinguishes lubricated oxidized aluminum weld wire Detailed examination shows some very small areas identified as nascent aluminum surfaces. The distributed particles are ofc-graphite 4 and $MoS_2$ 5.

Figure 5:
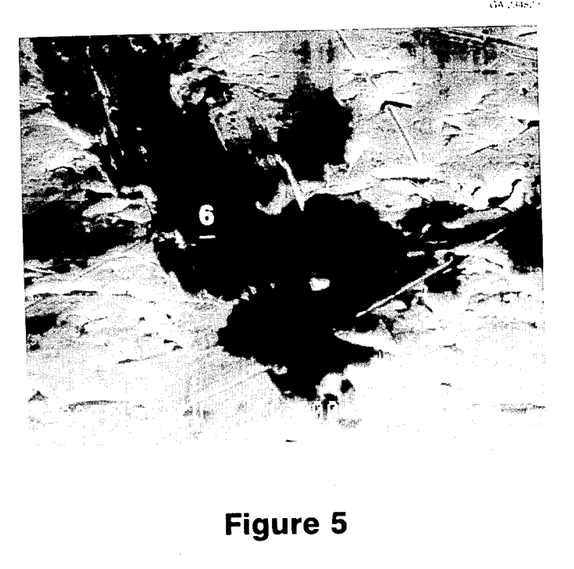
FIG. 5 is a photomicrograph of drawn aluminum 4043 weld wire, the nascent aluminum surface of which was ultraclean before the wire has drawn across a solid graphite block at different orientations.

Referring to FIG. 5, there is shown a portion of a graphite-coated ultraclean nascent aluminum surface after the weld weld wire was drawn across a graphite block at different orientations of the block, as taught by the Kobayashi reference, supra. As might be expected, there are localized areas of large masses of carbon which are torn off the graphite block. The central portion of the photomicrograph, indicated by reference numeral 6, show such a mass. The remaining bright areas are nascent aluminum 3, with the normal voids 1 (marked in the lower right hand corner of the photomicrograph).

I claim:

1. An arbitrary length of predominantly aluminum lubricated weld wire useful for welding and metallizing, and having a nascent aluminum surface lubricated with a dual coating consisting of an essentially anhydrous lower alkanol and a solid lubricant, each concurrently present as first and second thin layers, respectively, the first layer consisting of a substantially monoparticulate layer of essentially oil-free colloidal graphite particles, optionally in combination with a minor amount by weight of a colloidal sulfide of molybdenum, the second thin layer consisting of an essentially anhydrous lower alkanol having from 2 to 4 carbon atoms present in an amount in the range from about 100 ppm to about 0.1% by weight of said lubricated weld wire, the solid lubricant being present on the nascent aluminum surface as randomly distributed particles forming a non-uniform monoparticulate layer wherein the particles are in spaced-apart relation.

2. The lubricated predominantly aluminum wire of claim 1 selected from the group consisting of a wrought alloy of the 1000, 2000 and 4000 series, and a cast alloy of the 100, 200 and 300 series.

3. The lubricated predominantly aluminum wire of claim 2 wherein said first layer consists of from 50% to 100% by weight of essentially oil-free colloidal graphite, and from 0% to about 40% by weight of molybdenum disulfide, based on the total weight of solid lubricant.

4. The lubricated predominantly aluminum wire of claim 3 wherein said second layer consists predominantly of isopropanol having less than 1000 ppm water.

5. A spool of lubricated weld wire of arbitrary length having a nascent aluminum surface lubricated with a dual coating and hermetically sealed in an atmosphere containing a sufficiently high partial pressure of an essentially anhydrous lower alkanol having a partial pressure of at least 5 mm at 20° C., so as to provide protection against oxidation of the weld wire; said dual coating consisting of the alkanol and a solid lubricant, each concurrently present as first and second thin layers, respectively; the first layer consisting of a substantially monoparticulate layer of essentially oil-free colloidal graphite particles, in combination with from 0 to 49 parts by weight, based on 100 parts of solid lubricant, of a colloidal sulfide of molybdenum; the second thin layer consisting of the alkanol present in an amount in the range from about 100 ppm to about 0.1% by weight of the lubricated weld wire; the solid lubricant being deposited on the nascent aluminum surface from a dispersion of the colloidal solid lubricant particles in the alkanol, the solid lubricant being present in the dispersion in an amount in the range from about 1% to about 15% by weight based on the weight of the dispersion, whereby the solid lubricant particles are non-uniformly deposited in spaced-apart relation.

6. The spool of claim 5 wherein the lubricated weld wire is selected from the group consisting of a wrought alloy of the 1000, 2000, 4000/and 5000 series, and a cast alloy of the 100, 200 and 300 series.

7. The spool of claim 6 wherein the lubricated weld wire wherein said first layer consists of from 50% to 100% by weight of essentially oil-free colloidal graphite, and from 0% to about 40% by weight of molybdenum disulfide, based on the total weight of solid lubricant.

8. The spool of claim 6 wherein the lubricated weld wire wherein said second layer consists predominantly of isopropanol having less than 1000 ppm water.

9. A process for lubricating aluminum weld wire, comprising,
  (a) exposing nascent aluminum on essentially the entire outer surface of the weld wire while the wire is lubricated with a drawing lubricant.
  (b) removing the drawing lubricant with a solvent for it, to produce an ultraclean nascent aluminum surface,
  (c) soon thereafter contacting the ultraclean surface with a dispersion in an essentially anhydrous lower alcohol having from 2 to 4 carbon atoms, so as to produce an alkanol-wetted nascent aluminum surface on which is deposited the dispersed phase of colloidal solid lubricant consisting predominantly of essentially oil-free colloidal graphite, optionally in combination with a colloidal sulfide of molybdenum, the dispersed phase being present in an amount in the range from about 1% to about 15% by weight based on the weight of the dispersion, and,
  (d) removing a sufficient amount of the alkanol to deposit a substantially monoparticulate layer of solid lubricant particles in substantially spaced-apart relation over the alkanol-wetted nascent aluminum surface.

10. The process of claim 9 wherein the lubricated weld wire is selected from the group consisting of a wrought alloy of the 1000, 2000, 4000 and 5000 series, and a cast alloy of the 100, 200 and 300 series.

11. The process of claim 10 wherein the dispersed phase consists of from 50% to 100% by weight of essentially oil-free colloidal graphite, and, from 0% to about 40% by weight of molybdenum disulfide, based on the total weight of solid lubricant.

12. The process of claim 11 wherein the continuous phase of the dispersion consists predominantly of isopropanol having less than 1000 ppm water.

13. A process for lubricating aluminum alloy wire to improve the character of welds derived from using lubricated weld wire to weld aluminum and predominantly aluminum alloys, and the character of a predominantly aluminum deposit on a deposit-receptive substrate, comprising,
  (a) exposing nascent aluminum on essentially the entire outer surface of the wire which is selected from the group consisting of a wrought alloy of the 1000, 2000 and 4000 series, and a cast alloy of the 100, 200 and 300 series, while said wire is lubricated with a hydrogen-containing drawing oil,
  (b) replacing the drawing oil with a light mineral oil,
  (c) washing off the light mineral oil with a chlorocarbon solvent,
  (d) drying the wire which is coated with chlorocarbon so as to provide an ultraclean nascent aluminum surface,
  (e) soon thereafter contacting the nascent aluminum with a dispersion of a combination of oil-free colloidal graphite and a colloidal sulfide of molybdenum, in an essentially anhydrous lower alkanol having from 2 to 4 carbon atoms, the sulfide of molybdenum being present in an amount in the range from 0 to 49 parts by weight, based on 100 parts of lubricant solids, and,
  (f) removing a sufficient amount of the alkanol to deposit a non-uniform monoparticulate layer of colloidal particles of lubricant randomly distributed in spaced-apart relationship over the nascent aluminum surface, whereby the particles are present in a sufficiently small concentration so as to be rejected by the molten aluminum under conditions of welding or metallizing.

14. The process of claim 13 wherein the aluminum alloy is selected from the group consisting of a wrought alloy of the 1000, 2000, 4000/and 5000 series, and a cast alloy of the 100, 200 and 300 series.

15. The process of claim 14 wherein the dispersed phase consists of from 50% to 100% by weight of essentially oil-free colloidal graphite, and from 0% to about 40% by weight of molybdenum disulfide, based on the total weight of solid lubricant.

16. The process of claim 15 wherein the dispersed phase consists of from 60% to 90% by weight of essentially oil-free colloidal graphite, and from 10% to about 30% by weight of molybdenum disulfide, based on the total weight of solid lubricant.

17. The process of claim 15 wherein the continuous phase of the dispersion consists predominantly of isopropanol having less than 1000 ppm water.

18. A process for winding aluminum weld wire having a nascent aluminum surface, in level layers on a spool, said process comprising,
  (a) drawing a predominantly aluminum, flux-free, weld wire lubricated with a lubricant oil, to produce a oil-coated weld wire having a nascent aluminum surface;
  (b) contacting the oil-coated weld wire with sufficient solvent for the oil, the remove the oil from the surface and produce ultraclean weld wire having a nascent aluminum surface essentially free of the lubricant oil and solvent;
  (c) soon thereafter, passing the ultraclean weld wire through a dispersion of a colloidal solid lubricant in a hydrogen-containing continuous phase of an essentially anhydrous lower alkanol having from 2 to 4 carbon atoms;
  (d) removing sufficient excess dispersion so as to leave an alkanol-wetted weld wire with a spotted-graphite surface; and,
  (e) level-layer spooling the alkanol-wetted weld wire onto a spool.

19. The process of claim 18 wherein the aluminum weld wire is selected from the group consisting of a wrought alloy of the 1000, 2000, 4000/and 5000 series, and a cast alloy of the 100, 200 and 300 series.

20. The process of claim 19 wherein the dispersed phase of the dispersion consists of from 50% to 100% by weight of essentially oil-free colloidal graphite, and from 0% to about 40% by weight of molybdenum disulfide, based on the total weight of solid lubricant.

21. The process of claim 20 wherein the continuous phase of the dispersion consists predominantly of isopropanol having less than 1000 ppm water.

22. A process for welding aluminum and aluminum alloy surfaces with a lubricant composition to lubricate frictionally abutting aluminum and/or aluminum alloy surfaces forming a joint to be welded. comprising, (a) lubricating a portion of at least one of the surfaces with a dispersion of substantially oil-free colloidal graphite in an essentially anhydrous alkanol selected from the group consisting of ethanol, n-propanol, iso-propanol, n-butanol, 2-butanol, and isobutanol, the graphite being present in an amount in the range from about 1% to about 15% by weight based on the weight of the dispersion, (b) removing the lower alkanol, and, (c) welding the surfaces together with dual-coated weld wire having a nascent aluminum surface lubricated with a dual coating consisting of the alkanol and the graphite, each concurrently present as first and second thin layers, respectively; the first layer consisting of a substantially non-uniform monoparticulate layer of scattered graphite particles; the second layer consisting of the alkanol present in an amount in the range from about 100 ppm to about 0.1% by weight of said lubricated weld wire; the graphite being present on the aluminum surface as randomly distributed particles in substantially spaced apart relation.

23. A process for welding with a lubricated, predominantly aluminum weld wire through a feed tube for said wire, through which tube said wire is urged without significant binding therewithin, said process comprising, (a) feeding said wire which is selected from the group consisting of a wrought alloy of the 1000, 2000, 4000 and 5000 series, and a cast alloy of the 100, 200 and 300 series, having a nascent aluminum outer surface coated with a randomly spaced-apart particles forming a non-uniform monoparticulate layer of solid lubricant wetted with from about 100 ppm to about 0.1% by weight of an essentially anhydrous lower alkanol having a boiling point below 100° C. and a viscosity lower than about 5 cp at 15° C., said layer derived from a dispersion of a colloidal solid lubricant in the alkanol in which the solid lubricant is present in an amount in the range from about 1% to about 15% by weight, based on the weight of the dispersion, (b) positioning said lubricated wire in weld-forming proximity with a predominantly aluminum mass, and, (c) passing enough electric current to form an electric arc and form a weld bead free of occluded hydrogen.

24. The lubricated weld wire of claim 23 wherein said solid lubricant is selected from the group consisting of essentially oil-free colloidal graphite and colloidal molybdenum sulfide.

25. The lubricated weld wire of claim 24 wherein said wire has an equivalent diameter of less than 7 mm.

26. A process for metallizing with a lubricated predominantly aluminum metallizing wire through a feed tube for said wire, through which tube said wire is urged without significant binding therewithin, said process comprising, (a) feeding said wire which is selected from the group consisting of a wrought alloy of the 1000, 2000, 4000 and 5000 series, and a cast alloy of the 100, 200 and 300 series, having a nascent aluminum outer surface coated with a randomly spaced-apart particles forming a non-uniform monoparticulate layer of solid lubricant wetted with from about 100 ppm to about 0.1% by weight of an essentially anhydrous lower alkanol having a boiling point below 100° C. and a viscosity lower than about 5 cp at 15° C., said layer derived from a dispersion of a colloidal solid lubricant in the alkanol in which the solid lubricant is present in an amount in the range from about 1% to about 15% by weight, based on the weight of the dispersion, (b) vaporizing said lubricated wire in vapor-depositing proximity with a deposit-receptive surface, and, (c) depositing aluminum vapor essentially free of pores without occluding hydrogen.

27. The lubricated metallizing wire of claim 26 wherein said lubricant is selected from the group consisting of essentially oil-free colloidal graphite and colloidal molybdenum sulfide.

28. The lubricated metallizing wire of claim 27 wherein said wire has an equivalent diameter of less than 7 mm.

* * * * *